US 6,415,819 B1

United States Patent
Pas et al.

(10) Patent No.: US 6,415,819 B1
(45) Date of Patent: Jul. 9, 2002

(54) SWITCHING UNIT WHICH IS COMPOSED OF A SET OF SWITCHING VALVES AND IS SUITABLE FOR MAKING A FIRST AND SECOND MEDIUM FLOW THROUGH ONE OF TWO PLATE COOLERS AS DESIRED

(75) Inventors: Peter Pas, An Lengel; Fred Greter, Oosterbeek, both of (NL)

(73) Assignee: Indufil B.V., Duiven (NL)

( * ) Notice: Subject to any disclaimer, the term of this patent is extended or adjusted under 35 U.S.C. 154(b) by 0 days.

(21) Appl. No.: 09/788,642

(22) Filed: Jul. 18, 2001

(30) Foreign Application Priority Data

Feb. 21, 2000 (NL) .............................................. 1014456

(51) Int. Cl.[7] .............................................. F16K 11/10
(52) U.S. Cl. ............ 137/597; 137/637.1; 165/DIG. 105
(58) Field of Search .............................. 137/597, 637.1; 165/DIG. 105

(56) References Cited

U.S. PATENT DOCUMENTS

| | | | | |
|---|---|---|---|---|
| 1,366,900 A | * | 1/1921 | Benson | 165/DIG. 105 |
| 1,406,982 A | * | 1/1922 | Davis | 165/DIG. 105 |
| 1,566,605 A | * | 12/1925 | Jamison | 137/597 |
| 3,746,048 A | | 7/1973 | Harper | |
| 5,117,867 A | * | 6/1992 | Adams | 137/577 |
| 5,409,676 A | | 4/1995 | Nasako et al. | |

* cited by examiner

Primary Examiner—John Fox
(74) Attorney, Agent, or Firm—Young & Thompson

(57) ABSTRACT

A switching unit which is suitable for making a first and a second medium—for example oil and cooling water—flow through one of the two plate coolers as desired comprises four switching valves. The valve bodies of the four valves (1–4) are connected to one another by an actuating mechanism (19, 20, 21, 22), in such a manner that when one of the four valves is switched the other three valves are also switched. This definitively prevents incorrect switching operations.

4 Claims, 3 Drawing Sheets

SWITCHING UNIT WHICH IS COMPOSED OF A SET OF SWITCHING VALVES AND IS SUITABLE FOR MAKING A FIRST AND SECOND MEDIUM FLOW THROUGH ONE OF TWO PLATE COOLERS AS DESIRED

The invention relates to a switching unit which is composed of a set of switching valves and is suitable for making a first and a second medium flow through one of two plate coolers as desired.

Plate coolers are useful items of equipment for cooling hot oil which comes from machines using a flow of water. The oil and the cooling water are passed through the gaps between the plates in countercurrent to one another, with the result that the oil, in view of the large contact area of the plates, is efficiently cooled. From time to time, the plate cooler has to be cleaned, in order to prevent the machine in which the oil is used as lubricant from having to be shut down. Therefore, it is known to add two plate coolers to the machine. By means of a switching unit which is referred to in the preamble, it is possible to ensure that switching from the one plate cooler to the other plate cooler can take place without interruption to the oil cooling.

Known embodiments of the switching unit have eight two-way ball valves which are each mounted on a plate cooler and are formed into a unit by means of pipe systems. The switching from the one plate cooler to the other plate cooler takes place by firstly opening a set of four valves, then opening a second set of four valves and finally closing the first set of four valves. Switching errors may occur, with the result that the cooling of the lubricating oil of the machine, for example a ship propulsion engine, is endangered.

It is an object of the invention to avoid this drawback and to provide a switching unit which is referred to in the preamble and which precludes switching errors and takes up less space.

According to the invention, to this end the switching unit is characterized in that the switching unit has four switching valves, namely:

a first three-way switching valve allowing the first medium to be supplied to the one plate cooler or the other plate cooler,
  a second three-way switching valve allowing the first medium to be discharged from the one plate cooler or the other plate cooler,
  a third three-way switching valve allowing the second medium to be supplied to the one plate cooler or the other plate cooler,
  a fourth switching valve allowing the second medium to be discharged from the one plate cooler or the other plate cooler, and in that the valve bodies of the four valves are connected to one another by an actuating mechanism, in such a manner that when one of the four valves is switched the other three valves are also switched.

Preferably, the valve bodies of the first and second valves are arranged on a first common rotation axle and the valve bodies of the third and fourth valves are mounted on a second common rotation axle, and the first and second rotation axles are coupled to one another by a transmission, in such a manner that, when one of the axles rotates, the supply and discharge of the first medium to and from the one plate cooler is switched to the supply and discharge of the first medium to and from the other plate cooler, and also the supply and discharge of the second medium to and from the said one plate cooler is switched to the supply and discharge of the second medium to and from the said other plate cooler.

It is possible to make do with one actuating handle on one of the common axles.

In order not to produce any pressure shocks caused by flow blockages when switching from the one plate cooler to the other plate cooler, use is made of ball valves, the two limit positions of each of the rotation angles forming an angle of 90° with one another and a flow connection to two plate coolers being present in an intermediate position which lies at approximately 45° from the two limit positions.

The invention will now be explained in more detail with reference to the figures, in which.

Figure 3:
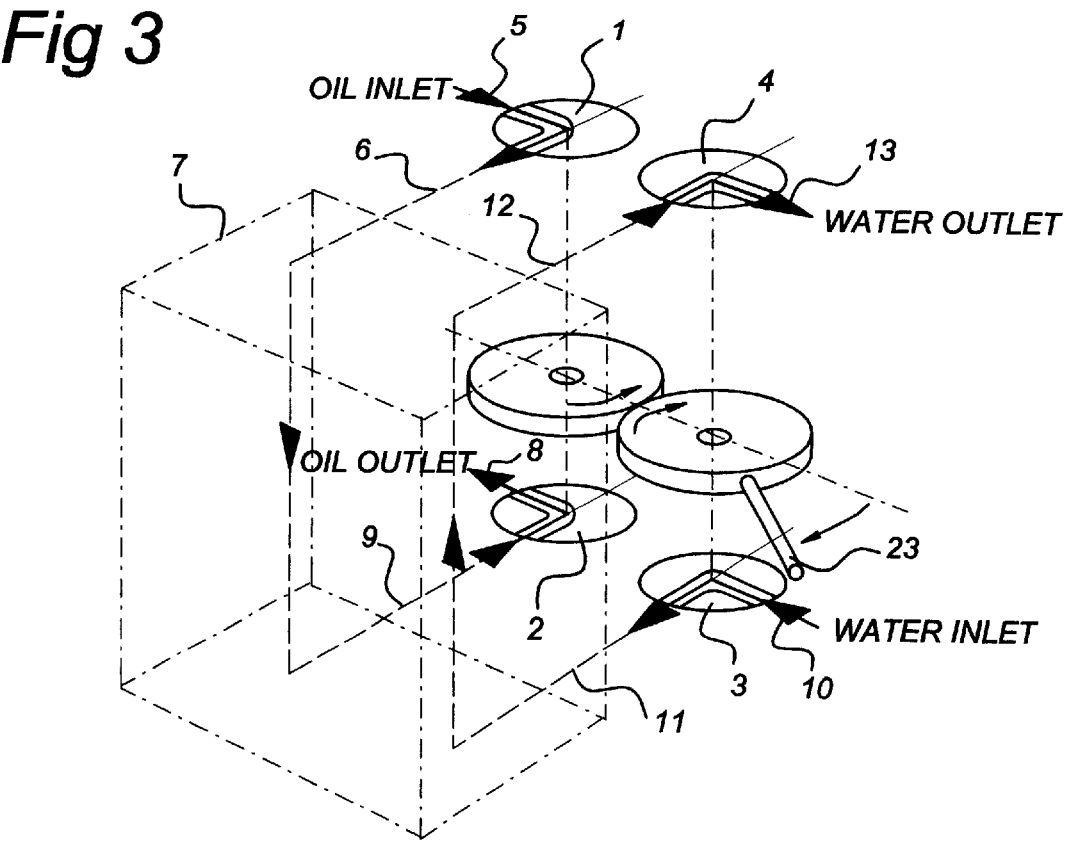
FIG. 3 shows a diagrammatic depiction of the switching unit according to the invention in one of the two operating positions.

The diagrammatic FIG. 3 shows a first switching position. The four switching valves—which are usually designed as ball valves—are denoted by 1, 2, 3 and 4.

Through an oil feed line 5, the hot oil is passed via the switching valve 1 to the inlet 6 of the first plate cooler 7. The cooled oil, which leaves the first plate cooler 7 via the oil outlet 9, is passed to the oil discharge line 8 via the switching valve 2. The cold cooling water is supplied through a line 10 and enters the water inlet 11 of the first plate cooler 7 via switching valve 3. The water which is heated in the first plate cooler 7 flows through the water inlet 12 and the switching valve 4 into the water discharge line 13.

Figure 4:
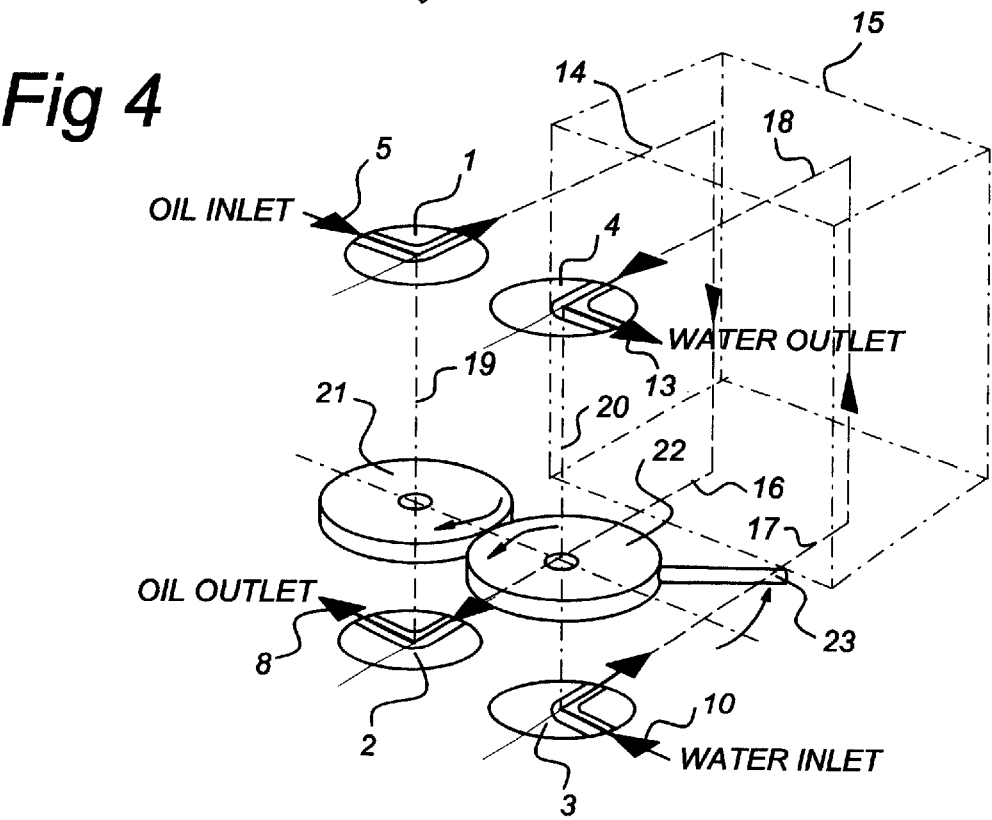
FIG. 4 shows a diagrammatic depiction of the switching unit in the other of the two operating positions.

The diagrammatic FIG. 4 shows the second switching position. Hot oil which is supplied through the feed line 5 flows to the inlet 14 of the second plate cooler 15 via the switching valve 1. The cooled oil passes via the oil outlet 16 of the second plate cooler 15 and the switching valve 2 into the oil discharge line 8.

Cooling water, which is supplied in the line 10, flows via the switching valve 3 to the inlet 7 in the second plate cooler 5, and the heated water flows via the water outlet 18 of the second plate cooler 5 and a switching valve 4 into the water discharge line 13.

The ball-like valve bodies of the switching valves 1 and 2 are arranged on a common axle 19 (indicated by dashed lines in FIGS. 3 and 4). The ball-like valve bodies of the switching valves 3 and 4 are arranged on a common axle 20, likewise denoted by dashed lines in FIG. 3.

Gearwheels 21 and 22 are fixed to the axles 19 and 20, respectively, which gearwheels mesh with one another. By turning one of the axles 19 and 20 or one of the gearwheels 21, 22 using an actuating lever 23, it is possible to switch from the switching position shown in FIG. 3 to that shown in FIG. 4 and vice versa. Errors are ruled out.

Figure 1:
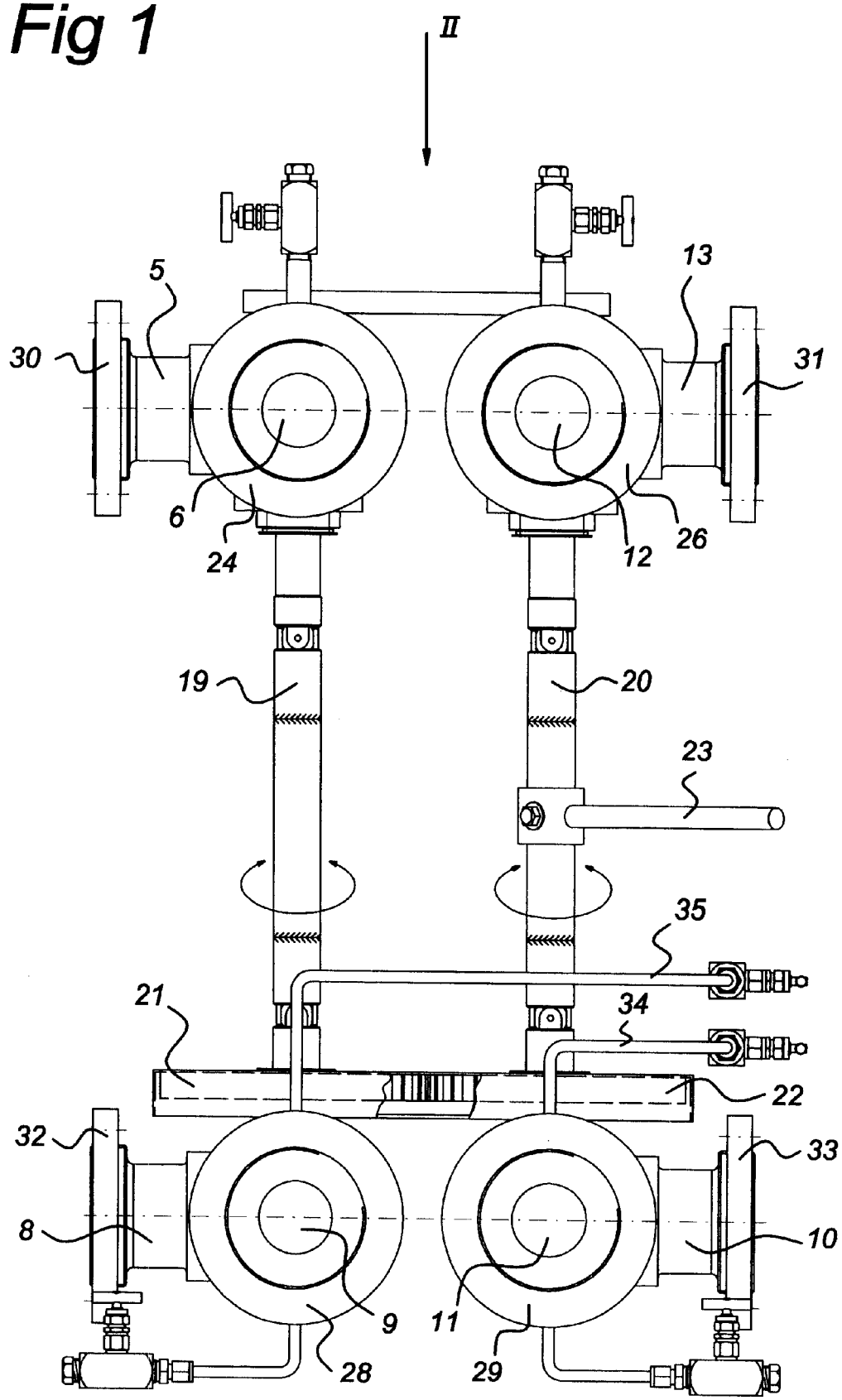
FIG. 1 shows a side view of a practical embodiment of a switching unit according to the invention.
Figure 2:
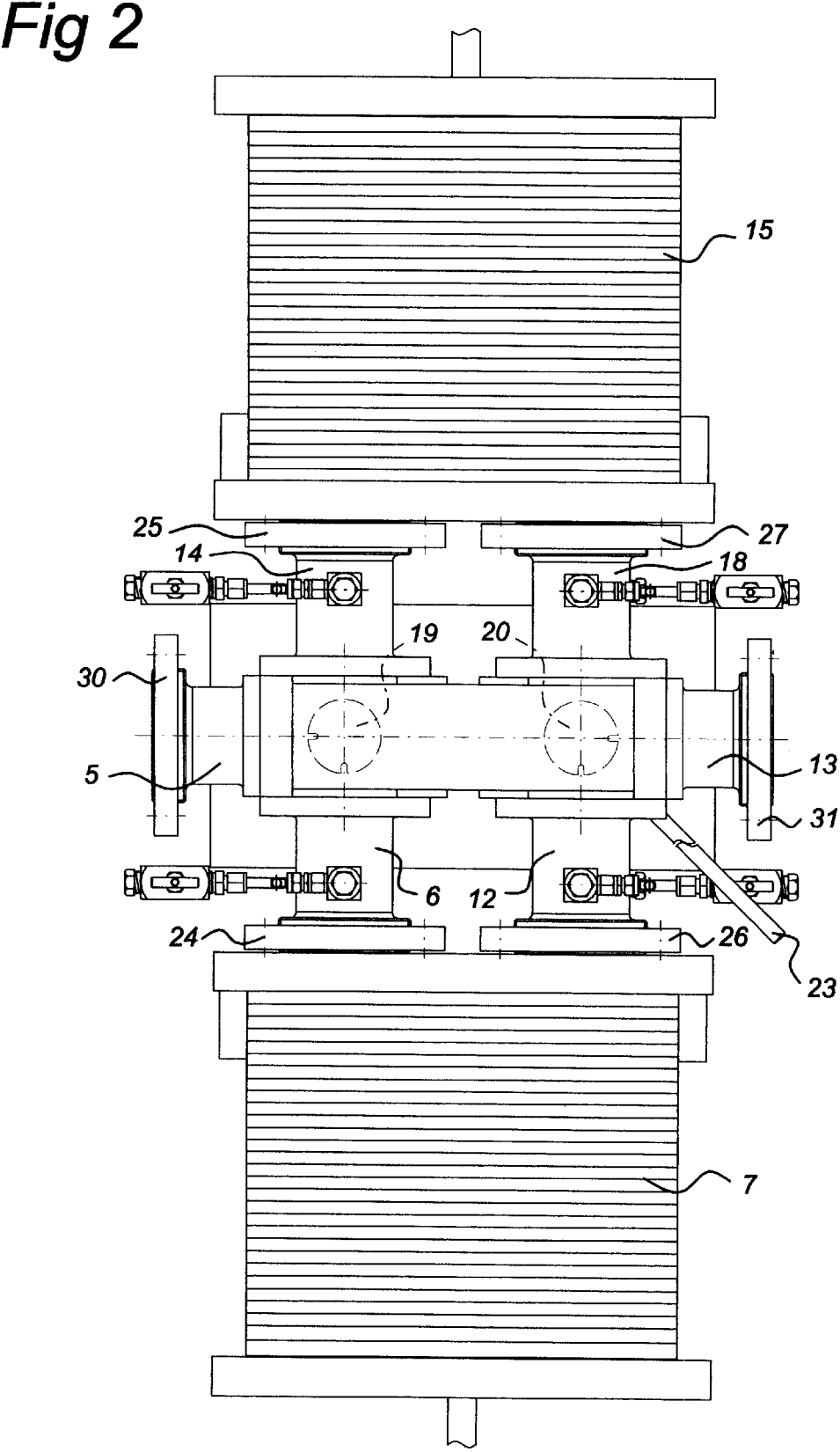
FIG. 2 shows a plan view of the unit shown in FIG. 1.

FIGS. 1 and 2 show a practical embodiment of the switching unit. The oil inlet 6 of the plate cooler 7 is connected to the plate cooler 7 via a flange connection 24 and the oil inlet 14 of the plate cooler 15 is connected to the plate cooler 15 via a flange connection 25.

The flange connection between the water outlet 12 and the plate cooler 7 is denoted by 26, and the flange connection between the water outlet 18 and the plate cooler 15 is denoted by 27. The flange connection between the oil outlet 8 and the plate cooler 7 has been given the reference numeral 28, and the flange connection between the water inlet 6 and the plate cooler 7 has been given the reference numeral 29.

The flange connection between the oil inlet line 5 and the housing of the oil inlet valve 1 is denoted by 30. The flange connection between the water outlet line 13 and the housing of the water outlet valve 4 is denoted by 21. The flange connection between the oil discharge line 8 and the housing of the oil outlet valve 2 is denoted by 32, and the flange connection between the water feed line 10 and the housing of the inlet valve 3 is denoted by 33.

To allow switching between use of the plate cooler 7 and use of the plate cooler 15, the oil pressure and the water pressure have to be equalized, for which purpose the oil-pressure equalization line 34 and the water-pressure equalization line 35 are used.

The switching valves 1 to 4 will usually comprise ball valves, an L-shaped channel being machined into the ball-shaped valve body. The ball bodies are diagrammatically indicated by a circle in FIGS. 3 and 4. To switch from the one switching position to the other switching position, the valve bodies are rotated through 90°, and to prevent the flows from becoming blocked during the switching, in an intermediate position (approx. 45° from the limit position) there is a flow connection between the two plate coolers.

What is claimed is:

1. Switching unit which is composed of a set of switching valves and is suitable for making a first and a second medium flow through one of two plate coolers as desired, characterized in that the switching unit has four switching valves, namely:

a first three-way switching valve (1) allowing the first medium to be supplied to the one plate cooler (7) or the other plate cooler (15), a second three-way switching valve (2) allowing the first medium to be discharged from the one plate cooler or the other plate cooler, a third three-way switching valve (3) allowing the second medium to be supplied to the one plate cooler or the other plate cooler, a fourth switching valve (4) allowing the second medium to be discharged from the one plate cooler or the other plate cooler, and in that the valve bodies of the four valves (1–4) are connected to one another by an actuating mechanism (19, 20, 21, 22), in such a manner that when one of the four valves is switched the other three valves are also switched.

2. Switching unit according to claim 1, characterized in that the valve bodies of the first and second valves (1, 2) are arranged on a first common rotation axle (19) and the valve bodies of the third and fourth valves (3, 4) are mounted on a second common rotation axle (20), and in that the first and second rotation axles (19, 20) are coupled to one another by a transmission (21, 22), in such a manner that, when one of the axles (19, 20) rotates, the supply and discharge of the first medium to and from the one plate cooler (7; 15) is switched to the supply and discharge of the first medium to and from the other plate cooler (15; 7), and also the supply and discharge of the second medium to and from the said one plate cooler (7; 15) is switched to the supply and discharge of the second medium to and from the said other plate cooler (15, 7).

3. Switching unit according to claim 2, characterized in that only one (20) of the common axles (19, 20) has an actuating handle (22).

4. Switching unit according to claim 1, characterized in that the switching valves are ball valves and the two limit positions of each of the rotation axles (19, 20) form an angle of approximately 90° with one another, and in that in an intermediate position, approximately 45° from the two limit positions, there is a flow connection to both plate coolers (7, 15).

* * * * *

UNITED STATES PATENT AND TRADEMARK OFFICE
CERTIFICATE OF CORRECTION

PATENT NO.    : 6,415,819 B1
DATED         : July 9, 2002
INVENTOR(S)   : Peter Pas et al.

It is certified that error appears in the above-identified patent and that said Letters Patent is hereby corrected as shown below:

<u>Title page,</u>
Item [22], amend to read as follows:

-- [22]  Filed:  Feb. 21, 2001 --.

Signed and Sealed this

Twenty-sixth Day of November, 2002

*Attest:*

JAMES E. ROGAN
*Attesting Officer*          *Director of the United States Patent and Trademark Office*